United States Patent
Dobson, Jr. et al.

(10) Patent No.: US 7,214,647 B2
(45) Date of Patent: *May 8, 2007

(54) METHOD OF INCREASING THE LOW SHEAR RATE VISCOSITY OF WELL DRILLING AND SERVICING FLUIDS CONTAINING CALCINED MAGNESIA BRIDGING SOLIDS, THE FLUIDS AND METHODS OF USE

(75) Inventors: James W. Dobson, Jr., Houston, TX (US); Kim O. Tresco, Houston, TX (US); Jorge M. Fernandez, Houston, TX (US)

(73) Assignee: Texas United Chemical Company, LLC., Houston, TX (US)

( * ) Notice: Subject to any disclaimer, the term of this patent is extended or adjusted under 35 U.S.C. 154(b) by 207 days.

This patent is subject to a terminal disclaimer.

(21) Appl. No.: 11/011,659

(22) Filed: Dec. 14, 2004

(65) Prior Publication Data

US 2006/0079406 A1    Apr. 13, 2006

Related U.S. Application Data

(63) Continuation-in-part of application No. 10/901,822, filed on Jul. 29, 2004.

(51) Int. Cl.
*C09K 8/04* (2006.01)

(52) U.S. Cl. .................. 507/110; 507/111; 507/112; 507/140; 507/211; 507/212; 507/213; 507/269

(58) Field of Classification Search ........ 507/110–112, 507/140, 211–212, 269, 213
See application file for complete search history.

(56) References Cited

U.S. PATENT DOCUMENTS

| 5,514,644 A * | 5/1996 | Dobson | 507/111 |
| 6,165,947 A * | 12/2000 | Chang et al. | 507/216 |
| 2004/0235675 A1 * | 11/2004 | Qiu | 507/200 |

* cited by examiner

*Primary Examiner*—Philip C. Tucker
(74) *Attorney, Agent, or Firm*—Roy F. House

(57) ABSTRACT

The invention provides well drilling and servicing fluids, and methods of drilling, completing, or working over a well therewith, preferred fluids comprise an aqueous liquid, a water soluble polymer viscosifier (preferably xanthan gum), a polymeric fluid loss control additive (preferably a partially depolymerized partially crosslinked hydroxyalkyl ether derivative of starch or a hydroxyalkyl ether derivative of a partially crosslinked and partially depolymerized starch), a bridging agent comprising a particulate calcined magnesia that has an Activity Index greater than about 800 seconds, and an additive selected from the group consisting of citric acid, alkali metal salts of citric acid, ammonium citrate, and mixtures thereof in an amount sufficient to increase the low shear rate viscosity of the fluids, preferably from about 0.05–5 ppb, most preferably from about 0.15–3 ppb. The invention further provides a method of increasing the low shear rate viscosity of fluids which contain a water soluble polymer and a calcined magnesia bridging agent which has an Activity Index greater than about 800 seconds.

32 Claims, No Drawings

METHOD OF INCREASING THE LOW SHEAR RATE VISCOSITY OF WELL DRILLING AND SERVICING FLUIDS CONTAINING CALCINED MAGNESIA BRIDGING SOLIDS, THE FLUIDS AND METHODS OF USE

This patent application is a continuation-in-part of patent application Ser. No. 10/901,822 filed Jul. 29, 2004.

This patent application claims priority to International patent application Serial No. PCT/US04/33237 filed Oct. 8, 2004.

BACKGROUND OF THE INVENTION

The present invention relates to clay-free aqueous well drilling and servicing fluids, methods of preparation thereof, and methods of drilling or servicing a well therewith.

The use of fluids for conducting various operations in the boreholes of oil and gas wells which contact a hydrocarbon-containing subterranean formation are well known. Thus, drill-in fluids are utilized when initially drilling into potential hydrocarbon producing formations. Completion fluids are utilized when conducting various completion operations in the hydrocarbon-containing formations. Workover fluids are utilized when conducting workover operations of previously completed wells.

It is important that the fluids which contact hydrocarbon-containing formations are formulated such that there is a minimum penetration of fluid, both the aqueous phase and the solid phase, into the formation. Thus, the present state-of-the-art fluids generally comprise a "water soluble" polymer, preferably a biopolymer such as xanthan gum or scleroglucan gum, starch derivatives for fluid loss control, and water soluble or acid soluble bridging agents to form a thin filter cake which forms a protective seal of the formation. See for example the following U.S. Patents, incorporated herein by reference: Mondshine U.S. Pat. No. 4,620,596; Dobson, Jr. et al. U.S. Pat. No. 4,822,500; Dobson, Jr. et al. U.S. Pat. No. 5,629,271; Dobson, Jr. et al. U.S. Pat. No. 5,641,728; Dobson, Jr. et al. U.S. Pat. No. 5,728,652; and Dobson, Jr. et al. U.S. Pat. No. 5,804,535. A recent development is a biopolymer-free fluid which utilizes a unique amylopectin starch derivative for both viscosity development and fluid loss control as set forth in Dobson, Jr. et al. U.S. Pat. No. 6,391,830.

After the well has been drilled and completed, it is necessary to remove the filter cake from the surface of the formation allowing the hydrocarbons therein to flow to the wellbore for production. This is generally aided by contacting the filter cake with various washes/soak solutions in which the components of the filter cake are soluble, most generally acidic aqueous fluids. See, for example, the following U.S. patents, incorporated herein by reference: Mondshine et al. U.S. Pat. No. 5,238,065; Dobson, Jr. et al. U.S. Pat. No. 5,607,905; Dobson, Jr. et al. U.S. Pat. No. 5,783,527; and Dobson, Jr. et al. U.S. Pat. No. 5,783,526.

As indicated in Mondshine U.S. Pat. No. 4,620,596, sparingly soluble borates have been utilized as bridging agents in well drilling and servicing fluids. However, one problem with their use in biopolymer-containing fluids is the crosslinking of the biopolymers that occurs when the borate anion reacts with the biopolymers. Thus, there is a need for another bridging agent that is sparingly soluble in water/aqueous systems and is soluble in acidic solutions.

Magnesium oxide and other particulate solids which are substantially insoluble in water but which are substantially soluble in aqueous ammonium salt solutions are disclosed for use as bridging agents in Todd et al. U.S. Pat. No. 6,422,314. Also disclosed therein in the well drilling and servicing fluids containing the magnesium oxide bridging agent is the use of certain water soluble salts, including sodium citrate, to increase the density of the fluids.

Powdered magnesium oxide is utilized in the art as an alkalinity control additive for biopolymer-containing fluids as exemplified by the U.S. patents referenced hereinbefore.

The magnesium oxide as referenced in Dobson, Jr. et al. U.S. Pat. No. 5,514,644, incorporated herein by reference, has an Activity Index less than about 100 seconds, most preferably less than about 50 seconds.

Disclosed in International patent application Serial No. PCT/US04/33237 filed Oct. 8, 2004 is the use of calcined magnesia which has an Activity Index greater than about 800 seconds as a bridging agent in polymer-containing well drilling and servicing fluids.

The calcined magnesia provides biopolymer-containing well drilling and servicing fluids which do not gel on thermal aging at temperatures at which the biopolymer does not decompose and which utilizes the particulate, sized magnesia particles as a bridging agent to form the required thin filter cake to limit fluid invasion into the hydrocarbon-containing formation contacted by the fluid.

The present invention pertains to stable well drilling and servicing fluids which provide a filter cake that is partially water soluble, soluble in ammonium salt solutions, and substantially acid soluble for improved removal from the sides of the borehole/face of the hydrocarbon-containing formations on which the filter cake is deposited, and a method of increasing the low shear rate viscosity thereof.

SUMMARY OF THE INVENTION

The present invention provides a stable water soluble polymer-containing well drilling and servicing fluid which utilizes as a bridging agent particulate, sized magnesia which has an Activity Index greater than about 800 seconds and from about 0.05 ppb to about 5 ppb of citric acid and/or an alkali metal or ammonium salt thereof to increase the low shear rate viscosity thereof.

The present invention further provides a method of drilling a well wherein there is circulated within the wellbore being drilled as drilling proceeds a water base drilling fluid containing as a bridging agent particulate, sized magnesia which has an Activity Index greater than about 800 seconds and from about 0.05–5 ppb of citric acid and/or an alkali metal or ammonium salt thereof to increase the low shear rate viscosity thereof.

The present invention further provides a process of completing or working over a well wherein a subterranean formation is contacted with an aqueous fluid wherein the fluid contains a bridging agent comprising a particulate, sized magnesia which has an Activity Index greater than about 800 seconds and from about 0.05–5 ppb of citric acid and/or an alkali metal or ammonium salt thereof to increase the low shear rate viscosity thereof.

The invention still further provides a method of increasing the low shear rate viscosity of water soluble polymer-containing well drilling and servicing fluids which comprises adding to the fluids from about 0.05–5 ppb of citric acid and/or an alkali metal or ammonium salt thereof sufficient to increase the low shear rate viscosity, but insufficient to increase the density of the fluids, wherein the fluids contain as a bridging agent a calcined magnesia which has an Activity Index greater than about 800 seconds.

Other objects, features and embodiments of the invention are disclosed in the following description of the invention and appended claims.

While the invention is susceptible to various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DETAILED DESCRIPTION OF THE INVENTION

It is well known in the oil and gas well drilling and servicing art to employ aqueous well drilling and servicing fluids (hereinafter sometimes referred to as "WDSF") which exhibit an elevated low shear rate viscosity (hereinafter sometimes referred to as "LSRV"). Such fluids are pseudoplastic, shear thinning fluids and are particularly preferred fluids when conducting horizontal or directional drilling or well servicing operations in boreholes. See for example Dobson, Jr. et al. U.S. Pat. No. 5,804,535.

We have now found that the LSRV of WDSF comprising an aqueous phase, a water soluble polymer viscosifier/suspension agent, and a calcined magnesia bridging agent having an activity index greater than about 800 seconds can be increased by adding thereto from about 0.05–5 ppb of citric acid and/or an alkali metal or ammonium salt thereof. Hereinafter the LSRV increasing additive of the invention will be referred to as "citrate". The citrate is selected from the group consisting of citric acid, sodium citrate, potassium citrate, ammonium citrate, and mixtures thereof.

The concentration of the citrate must be sufficient to increase the LSRV of the well drilling and servicing fluid without increasing the density of the fluid, such as from about 0.05–5 ppb of the fluid, preferably from about 0.1–4 ppb, and most preferably from about 0.15 to about 3 ppb of the fluid. Also, depending on the polymer viscosifier and its concentrations, it has been found that an excessive concentration of the citrate can cause the fluid to gel on static aging at elevated temperatures. Thus the concentration of the citrate must be insufficient to cause such gelation. The maximum quantity of the citrate can be readily determined in any particular fluid by incorporating the citrate in the fluid and static aging the fluid at the maximum temperature to which the fluid will be exposed during the well drilling and servicing operation, as is well known in the art.

As indicated, the WDSF of this invention comprise an aqueous phase, a water soluble polymer viscosifier/suspension agent, a calcined magnesia bridging agent having an activity index greater than about 800 seconds, and from about 0.05 ppb to about 5 ppb of a citrate.

The Activity Index of magnesia is obtained using the following apparatus and test procedures.

The rate at which magnesium oxide reacts with a dilute solution of acetic acid is used as a measure of activity. An excess of magnesia is used so that at the end point of the reaction, the solution goes from acidic to basic and is detected by a color change employing phenolphthalein indicator.

Apparatus and Reagents:
Acetic acid solution 1.00±0.01N, standardized
Phenolphthalein soln. (1% solution in ethanol)
Waring blender, 2 speed with 32 oz. glass container
Balance with sensitivity of 0.01 gm
Stopwatch
Thermometer
Graduated cylinders, 100 ml and 500 ml
Procedure
1. Prior to the test, the water and the acetic acid solution should be brought to a temperature of 25±1 C.
2. Weigh a 5.00±0.02 grams aliquot of the magnesia sample.
3. Measure out 300 ml of water in a graduated cylinder and add it to the blender.
4. Carefully hold a thermometer in the blender and run blender until the temperature of the water is 28 C. Turn off the blender.
5. Add 5–10 drops of phenolphthalein indicator solution.
6. Add the magnesia sample and immediately start the blender on low speed.
7. Count ten seconds from the start of the blender and add 100 ml of the 1.00N acetic acid solution. The stopwatch is started as the acid is being added.
8. Stop the timer when the solution turns to a definite pink color. Record the reaction time in seconds as the activity index of the magnesia.
9. Note: Add three to five additional drops of indicator solution to the blender every 30 seconds until the color change has taken place.

Magnesia having an Activity Index less than about 800 seconds is too water soluble producing biopolymer-containing fluids which become gelatinous on heating.

The preferred WDSF of the invention comprise one or more polymer viscosifier/suspension agents, one or more polymeric fluid loss control agents, the calcined magnesia bridging agent, and a citrate dispersed in an aqueous liquid.

The preferred polymer viscosifier is a biopolymer (microbial polysaccharide). The term "biopolymer" is intended to mean an excellular polysaccharide of high molecular weight, in excess of about 500,000, produced by fermentation of a carbohydrate source by the action of bacteria or fungi. Representative microorganisms are the genus *Xanthomonas, Pseudomonas, Agrobacterium, Arthrobacter, Rhizobium, Alcaligenes, Beijerincka*, and *Sclerotium*. A scleroglucan type polysaccharide produced by microorganisms such as NCIB 11592 and NCIB 11883 is commercially available from Degussa.

The preferred biopolymer viscosifier useful in the practice of this invention is preferably a *xanthomonas* gum (xanthan gum). *Xanthomonas* gum is available commercially from Cargill, Rhodia and other companies. It is a widely used viscosifier and suspending agent in a variety of fluids. *Xanthomonas* gum can be made by the fermentation of carbohydrate with bacteria of the genus *Xanthomonas*. Representative of these bacteria are *Xanthomonas campestris, Xanthomonas phaseoli, Xanthomonas anthomonas mulvacearn, Xanthonionas carotoe, Xanthomonas traslucens, Xanthomonas hederae*, and *Xanthomonas papavericoli*. The gum produced by the bacteria *Xanthomonas campestris* is preferred for the purpose of this invention. The fermentation usually involves inoculating a fermentable broth containing a carbohydrate, various minerals and a nitrogen yielding compound. A number of modifications in the fermentation procedure and subsequent processing are commercially used. Due to the variety of fermentation techniques and difference in processing operation subsequent to fermentation, different production lots of *xanthomonas* gum will have somewhat different solubility and viscosity properties. *Xanthomonas* gums useful in the practice of the present invention are relatively hydratable *xanthomonas* gums.

Xanthan gum is a polymer containing mannose, glucose, glucuronic acid salts such as potassium glucuronate, sodium glucuronate, or the like, and acetyl radicals. Other *Xanthomonas* bacteria have been found which produce the hydrophilic gum and any of the xanthan gums and their derivatives can be used in this invention. Xanthan gum is a high molecular weight linear polysaccharide that is readily soluble in water to form a viscous fluid.

Other biopolymers prepared by the action of other bacteria, or fungi, on appropriate fermentation mediums may be used in the fluids of the present invention provided that they impart the desired thermally stable rheological characteristics thereto. This can be readily determined by one skilled in the art in accordance with the teachings of this specification.

Polymeric fluid loss control additives used in well drilling and servicing fluids are so-called water soluble polymers including pregelatinized starch, starch derivatives, cellulose derivatives, lignocellulose derivatives, and synthetic polymers. Representative starch derivatives include: hydroxyalkyl starches such as hydroxyethyl starch, hydroxypropyl starch, hydroxypropyl carboxymethyl starch, the slightly crosslinked derivatives thereof, and the like; carboxymethyl starch and the slightly crosslinked derivatives thereof; cationic starches such as the tertiary aminoalkyl ether derivatives of starch, the slightly crosslinked derivatives thereof, and the like. Representative cellulose derivatives include low molecular weight carboxymethyl cellulose, and the like. Representative lignocellulose derivatives include the alkali metal and alkaline earth metal salts of lignosulfonic acid and graft copolymers thereof. Representative synthetic polymers include vinyl sulfonate copolymers, and polymers containing other sulfonate monomers.

The preferred polymeric fluid loss control additives used in the invention are the starch ether derivatives such as hydroxyethyl starch, hydroxypropyl starch, dihydroxypropyl starch, carboxymethyl starch, hydroxyalkyl carboxymethyl starch, and cationic starches, and the slightly crosslinked derivatives of these starch ethers, most preferably the hydroxypropyl ether derivative of starch and the slightly crosslinked derivatives thereof.

Most preferably the polymeric fluid loss control additive is a starch ether derivative which has been slightly crosslinked, such as with epichlorohydrin, phosphorous oxychloride, soluble trimetaphosphates, linear dicarboxylic acid anhydrides, N,N$^1$-methylenebisacrylamide, and other reagents containing two or more functional groups which are able to react with at least two hydroxyl groups. The preferred crosslinking reagent is epichlorohydrin. Generally, the treatment level is from about 0.005% to about 0.1% of the starch to give a low degree of crosslinking of about one crosslink per 200 to 1000 anhydroglucose units. The crosslinking may be undertaken before or after the starch is derivatized. Additionally, the starch may be modified by acid or enzyme hydrolysis or oxidation, to provide a lower molecular weight, partially depolyermized, starch polymer for derivatization. Alternatively, the starch ether derivative may be modified by acid hydrolysis or oxidation to provide a lower molecular weight starch ether derivative. The book entitled "Modified Starches: Properties and Uses," by O. B. Wurzburg, 1986 (CRC Press, Inc., Boca Raton, Fla., U.S.A.) is an excellent source for information in the preparation of starch derivatives.

Still most preferably, the polymeric fluid loss additive is a starch derivative selected from the group consisting of (1) a crosslinked ether derivative of a partially hydrolyzed starch, (2) a partially depolymerized, crosslinked ether derivative of starch, and (3) mixtures thereof, as set forth in Dobson, Jr. et al. U.S. Pat. No. 5,641,728, incorporated herein by reference, commercially available as BROMA FLA™ from TBC-Brinadd, Houston, Tex.

In case (1) the starch is partially depolymerized prior to crosslinking and derivatizing the starch, whereas in the latter case (2) the starch is first crosslinked and derivatized prior to partially depolymerizing the starch derivative. In either case, the molecular weight of the crosslinked starch derivative is decreased by the partial depolymerization of the starch polymer. As used throughout this specification and claims, the terms "partially depolymerized starch derivative," and "hydrolyzed starch derivative" and the like are intended to mean the starch derivatives prepared by either case (1) or case (2).

In case (1), it is preferred that the starch be hydrolyzed or depolymerized to the extent that the viscosity of an aqueous dispersion of the starch is reduced about 25% to about 92%, preferably about 50% to about 90%, prior to crosslinking and derivatizing the starch. In case (2), it is preferred that the crosslinked starch derivative be hydrolyzed or depolymerized to the extent that the viscosity of a water dispersion of the starch derivative at a concentration of 60 kg/m$^3$ is reduced about 15% to about 50%, preferably about 20% to about 40%.

Patents which disclose oxidative processes for partially depolymerizing starch derivatives and/or starches include the following, incorporated herein by reference: U.S. Pat. No. 3,975,206 (Lotzgesell et al.); U.S. Pat. No. 3,935,187 (Speakman); U.S. Pat. No. 3,655,644 (Durand). Patents which disclose acidic processes for partially depolymerizing starch derivatives and/or starches include the following, incorporated herein by reference: U.S. Pat. No. 3,175,928 (Lancaster et al.); U.S. Pat. No. 3,073,724 (Rankin et al.). Reference information on the acid modification of starches is presented in "Starch: Chemistry and Technology" 2nd Edition, 1984, Roy L. Whistler, James N. Bemiller and Eugene F. Paschall, editors, Chapter XVII, pp. 529–541, "Acid-Modified Starch: Production and Uses."

The partially depolymerized or hydrolyzed starch in case (1) or the starch in case (2) is crosslinked with a compound the molecules of which are capable of reacting with two or more hydroxyl groups. Representative crosslinking materials are epichlorohydrin and other epihalohydrins, formaldehyde, phosphorous oxychloride, trimetaphosphate, dialdehydes, vinyl sulfone, diepoxides, diisocyanates, bis (hydroxymethyl) ethylene urea, and the like. The preferred crosslinking compound is epichlorohydrin. Crosslinking of the starch (or hydrolyzed starch) results in an increase in the molecular weight of the starch and an increase in the viscosity of aqueous dispersions of the starch.

The reaction conditions used in making crosslinked starches vary widely depending upon the specific bi- or polyfunctional reagent used for the crosslinking. In general, most of the reactions are run on aqueous suspensions of starch at temperatures ranging from room temperature up to about 50° C. Often an alkali such as sodium hydroxide is used to promote reaction. The reactions are normally run under neutral to fairly alkaline conditions, but below the level which will peptize or swell the starch. If the crosslinking reaction is run in an aqueous suspension of starch, when the desired level of crosslinking (usually as measured by some type of viscosity or rheology test) is reached, the starch suspension is neutralized and the starch is filtered and washed to remove salts, any unreacted reagent, and other impurities produced by side reactions of the crosslinking reagent with water. Konigsberg U.S. Pat. No. 2,500,950 discloses the crosslinking of starch with epoxyhalogen compounds such as epichlorohydrin.

It is preferred that the starch or hydrolyzed starch for use in the present invention be crosslinked with epichlorohydrin in a basic aqueous starch suspension at a temperature and for a period of time such that the Brabander viscosity of the suspension is within about 50% to 100% of the maximum viscosity. The viscosity will vary by the amount of crosslinking and the test conditions, i.e., temperature, concentrations, etc. A viscosity peak indicates maximum crosslinking. When the desired viscosity is reached, the crosslinking reaction is terminated. A Brabender viscometer is a standard viscometer readily available on the open market and well known to those skilled in the art.

Generally, the treatment level is from about 0.005% to about 0.1% of starch to give a low degree of crosslinking of about one crosslink per 200 to 1000 anhydroglucose units. As indicated, the crosslinking may be undertaken before or after the starch is derivatized.

The epichlorohydrin crosslinked starch is then preferably reacted with propylene oxide to form the hydroxypropyl ether. The reaction of propylene oxide and starch is base catalyzed. Aqueous slurry reactions are generally catalyzed by 0.5 to 1% sodium hydroxide based on the dry weight of starch. Sodium sulfate or sodium chloride may be added to keep the starch from swelling during reaction with the propylene oxide. Reaction temperatures are generally in the range of from about 37.7° C. to about 51.7° C. (100° to 125° F.). Propylene oxide levels generally range from about 1% to about 10% based on the dry weight of the starch. Propylene oxide-starch reactions take approximately 24 hours to complete under the conditions described and are about 60% efficient with respect to the propylene oxide. It is preferred that the epichlorohydrin crosslinked hydroxypropyl ether contain from about 0.5% to about 5% reacted propylene oxide based on the dry weight of starch or hydrolyzed starch.

Other methods of preparing epichlorohydrin crosslinked starches and hydroxypropyl starch ethers are well known in the art.

The preferred starch ether derivative as indicated is the hydroxypropyl ether. Other representative starch derivatives are hydroxyethyl ethers, carboxymethyl ethers, dihydroxypropyl ethers, hydroxyalkyl carboxymethyl ethers, and cationic starch ethers. The preparation of such starch derivatives is well known in the art.

The particle size distribution of the calcined magnesia bridging agent must be sufficient to bridge across and seal the pores in the subterranean formation contacted by the fluid. Generally, as disclosed in U.S. Pat. No. 4,175,042, incorporated herein by reference, the particle size range is from about 5 microns to about 800 microns with greater than about 5% by weight of the particles being coarser than about 44 microns. However, as indicated in Dobson, Jr. et al. U.S. Pat. No. 5,629,271, incorporated herein by reference, the addition of a supplementary bridging agent having a particle size such that at least 90% of the particles thereof are less than 10 microns and the average particle size is from about 3 to about 5 microns decreases the fluid loss of the fluids and reduces the concentration of polymer required to impart the desired degree of fluid loss control to the fluids. This in effect increases the concentration of particles less than 10 microns diameter in the fluid.

Since the particle size distribution of the bridging agent needed in any well drilling and servicing operation is related to the size of the openings in the formations to be bridged and sealed, it is preferred to have several particulate, sized magnesia products having different particle size distributions which can be blended to produce fluids effective in sealing the formations contacted by the fluids.

The aqueous liquid used to prepare the WDSF of this invention may be any liquid compatible with the polymeric viscosifier and the polymeric fluid loss control additive used to prepare the WDSF. Thus, the aqueous liquid may be natural or a synthetic brine having one or more water soluble salts dissolved therein. Exemplary water soluble salts well known in the art are sodium chloride, calcium chloride, potassium chloride, sodium bromide, calcium bromide, potassium bromide, zinc bromide, sodium formate, potassium formate, cesium formate, and other water soluble salts as desired. Generally, the concentration of water soluble salts in the aqueous brine may be any concentration up to saturation in order to provide the aqueous liquid with the density desired, such as from 8.3 ppg (1000 kg/m$^3$) to about 19.2 ppg (2304 kg/m$^3$).

The fluids of this invention are further characterized in Table A.

TABLE A

| | Operable | Preferred | Most Preferred |
|---|---|---|---|
| Water Soluble Polymer Viscosifier, ppb | 0.5–5 | 0.75–4 | 1–3 |
| Fluid Loss Control Additive, ppb | 2–15 | 3–10 | 4–8 |
| Calcined Magnesia Bridging Agent, ppb | 15–100 | 20–80 | 25–60 |
| Citrate, ppb | 0.05–5 | 0.1–4 | 0.15–3 |
| Low Shear Rate Viscosity, cp* | >10,000 | >15,000 | >20,000 |
| Spurt Loss, ml*,** | <5 | <3 | <3 |
| 30-Minute Fluid Loss, ml*,** | <15 | <10 | <10 |

*Determined as disclosed hereinafter
**The preferred fluids containing a polymeric fluid loss control agent The fluids of the invention may be prepared and the method of the invention practiced, by mixing the aqueous liquid as set forth herein with the polymeric viscosifier, the polymer fluid loss control additive if present, the bridging agent, the citrate, and any optional additives as desired.

The fluids of the invention are useful in various petroleum recovery operations such as well drilling, including drilling into hydrocarbon-containing formations, completion, workover and the like all as are well known in the art. Specifically the fluids of the invention are useful in drilling a well wherein the drilling fluid is circulated within a borehole being drilled as drilling proceeds, and in well completion and workover methods wherein a subterranean formation is contacted with an aqueous fluid to form a bridge and seal on the formation, all as are well known in the art.

The low shear rate viscosity (LSRV) for purposes of this invention is obtained using a Brookfield Model LVTDV-1 viscometer having a number 1 or 2 spindle at 0.3 revolutions per minute (shear rate of 0.0636 sec$^{-1}$). The fluid loss characteristics of the fluids are obtained by a modified API filtration test. Thus, to an API high temperature filtration cell with removable end cages is added a 10 micron disk (i.e., an aluminum oxide Aloxite™ ceramic disk having 10 micron pore throats, from 600 to 750 md permeability, which is 2.5 inches in diameter and 0.25 inch in depth) saturated with water. The fluid to be tested is poured along the inside edge of the filtration cell. The filtration test is then conducted for 30 minutes at the desired temperature of 150° F. under a pressure differential of 500 pounds per square inch supplied by nitrogen. The spurt loss is measured as the amount of fluid expelled from the filtration cell until the flow of fluid is reduced to drops. The fluid loss is measured as the total amount of fluid collected in 30 minutes.

The Fann viscosity data is obtained utilizing a Fann 35 viscometer in accordance with the procedures set forth in API Recommended Practice RP-13B-1.

The typical particle size distribution of these particulate, sized magnesia products utilized in the examples to follow is set forth in Table B. The calcined magnesia products are available from TBC-Brinadd, Houston, Tex. The Activity Index of these products is a follows: MAG 5—840 seconds; MAG 10—1410 seconds; MAG 20—1740 seconds; MAG 30—1890 seconds.

TABLE B

Typical Volume % of Particles Under the Indicated Size

| Particle Size, microns | MAG 5 | MAG 10 | MAG 20 | MAG 30 |
|---|---|---|---|---|
| 3.09 | 26.81 | 17.49 | 10.23 | 10.6 |
| 5.03 | 43.36 | 27.71 | 17.53 | 16.13 |
| 5.86 | 50* | — | — | — |
| 9.86 | 76.02 | 46.72 | 30.79 | 26.38 |
| 10.82 | — | 50* | — | — |
| 15.12 | 92.97 | 63.12 | 41.67 | 34.3 |
| 19.75 | — | — | 50* | — |
| 20.52 | 98.88 | 76.42 | 51.3 | 41.0 |
| 26.2 | 100 | 86.15 | 60.22 | 45.2 |
| 29.11 | — | — | — | 50* |
| 35.56 | 100 | 95.0 | 72.66 | 55.8 |
| 44 | 100 | 98.5 | 81.3 | 62.3 |
| 57.97 | 100 | 100 | 90.72 | 71.2 |
| 106.8 | 100 | 100 | 100 | 86.5 |
| 415.7 | 100 | 100 | 100 | 100 |

*Medium particle size ($D_{50}$)

The particle size of the magnesia is determined with a Malvern Instruments' MASTERSIZER particle size analyzer. The preferred particle size of the calcined magnesia has an average particle size ($D_{50}$) from about 5 microns to about 50 microns.

The Activity Index of the calcined magnesia decreases as the particle size decreases. The Activity Index of the calcined magnesia before grinding and sizing for the magnesia samples A, B, and C was greater than 40 minutes. Calcined magnesia having a median particle size ($D_{50}$) of 30, 50 and 150 microns has an Activity Index of 1890, 2940, and 5610 seconds, respectively. The preferred calcined magnesia has an Activity Index from about 800 seconds to about 3000 seconds.

In order to more completely describe the invention, the following non-limiting examples are given. In these examples and this specification, the following abbreviations may be used: API=American Petroleum Institute; LSRV=Brookfield low shear rate viscosity at 0.03 revolutions per minute, 0.0636 sec$^{-1}$, in centipoise; sec=second(s); ppg=pounds per gallon; ppb=pounds per 42 gallon barrel; ° F.=degrees Fahrenheit; g=grams; ml=milliliters; min=minutes; cp=centipoise; lb=pounds; rpm=revolutions per minute; in=inches; sq.ft.=square feet; GS=gel strength.

EXAMPLE A

Well drilling and servicing fluids were prepared containing 290.5 ml of water, 104 g (ppb) of NaCl, 7.0 g (ppb) BROMA FLA™ starch derivative, 10 g (ppb) MAG 10, 30 g (ppb) MAG 20, and the concentrations of xanthan gum and citric acid set forth in Table 1. The properties after static-aging the fluids for 16 hours at 150° F. were determined. The data obtained are set forth in Table 1. The data indicate the excellent stability of the fluids and the increase of the LSRV by the addition of the citric acid.

The starch derivative BROMA FLA™ available from TBC-Brinadd, Houston, Tex.

TABLE 1

| | 1-1 | 1-2 | 1-3 | 1-4 | 1-5 | 1-6 |
|---|---|---|---|---|---|---|
| Fluid | | | | | | |
| Xanthan Gum, g (ppb) | 1.25 | 1.25 | 1.25 | 1.25 | 1.25 | 1.0 |
| Citric Acid, g (ppb) | 0 | 0.25 | 0.50 | 0.75 | 1.0 | 1.0 |
| Properties After Static Aging at 150° F. for 16 Hours, Test Temperature 120° F. | | | | | | |
| PV, cp | 17 | 16 | 17 | 17 | 21 | 19 |
| YP, lb/100 sq. ft. | 28 | 38 | 37 | 42 | 49 | 41 |
| 10-Sec GS, lb/100 sq. ft. | 9 | 15 | 15 | 16 | 18 | 14 |
| 10-Min, GS, lb/100 sq. ft. | 11 | 18 | 18 | 19 | 23 | 17 |
| LSRV, cp | 16,700 | 44,100 | 38,400 | 43,100 | 62,200 | 31,000 |
| pH | 11.1 | 10.9 | 10.7 | 10.7 | 10.5 | 10.3 |
| Fluid Loss | | | | | | |
| Spurt Loss, ml | 3.0 | 2.0 | 1.5 | 2.0 | 2.0 | 2.0 |
| 30 min., ml | 8.0 | 5.5 | 5.0 | 5.5 | 5.0 | 6.0 |

EXAMPLE B

Well drilling and servicing fluids were prepared containing 336 ml (0.96 bbl equivalents) of a 10.0 ppg sodium chloride brine, 1.25 g (ppb) of xanthan gum, 7.0 g (ppb) of BROMA FLA™ starch derivative, 10 g (ppb) MAG 10, 30 g (ppb) MAG 30, and the concentrationis of citric acid or sodium citrate set forth in Table 2. The properties of the fluids at 120° F. after hot rolling for 16 hours at 150° F. and mixing for 10 minutes are set forth in Table 2. The data indicate the increase in the LSRV of the fluids on addition of the citric acid and sodium citrate.

TABLE 2

|  | 2-1 | 2-2 | 2-3 | 2-4 | 2-5 |
|---|---|---|---|---|---|
| Fluid | | | | | |
| Citric Acid, g | 0 | 1.0 | 5.0 | 0 | 0 |
| Sodium Citrate, g | 0 | 0 | 0 | 1.0 | 5.0 |
| Properties After Static Aging at 150° F. for 16 hours, Test Temperature 120° F. | | | | | |
| PV, cp | 19 | 22 | 57 | 19 | 20 |
| YP, lb/100 sq. ft. | 32 | 55 | 75 | 32 | 42 |
| 10-Sec GS, lb/100 sq. ft. | 11 | 18 | 25 | 15 | 15 |
| 10-Min GS, lb/100 sq. ft. | 15 | 26 | 39 | 23 | 22 |
| LSRV, cp (×10$^{-3}$) | 27.9 | 47.1 | 75.7 | 40.7 | 40.2 |
| pH | 10.4 | 10.3 | 9.2 | 10.8 | 11.1 |
| Fluid Loss | | | | | |
| Spurt Loss, ml | 2.0 | 2.0 | 2.0 | 1.5 | 1.5 |
| 30 min, ml | 6.0 | 5.5 | 6.0 | 4.5 | 4.5 |

What is claimed is:

1. A well drilling and servicing fluid comprising an aqueous liquid, a biopolymer viscosifier, a particulate magnesia bridging agent wherein the magnesia has an Activity Index greater than about 800 seconds, wherein the biopolymer is produced by fermentation of a carbohydrate source by the action of bacteria or fungi which is an excellular polysaccharide having a molecular weight in excess of about 500,000, and from about 0.05 ppb to about 5 ppb of a low shear rate viscosity increasing additive selected from the group consisting of citric acid, alkali metal salts of citric acid, ammonium citrate, and mixtures thereof.

2. The fluid of claim 1 wherein the biopolymer is xanthan gum.

3. The fluid of claim 1 further comprising a polymeric fluid loss control additive selected from the group consisting of pregelatinized starch, starch derivatives, cellulose derivatives, and mixtures thereof.

4. The fluid of claim 3 wherein the polymeric fluid loss control additive is a starch derivative selected form the group consisting of hydroxyethyl starch, hydroxypropyl starch, hydroxyalkyl carboxymethyl starch, carboxymethyl starch, tertiary aminoalkyl ether derivatives of starch, and the slightly crosslinked derivatives of such derivatized starches, and mixtures thereof.

5. The fluid of claim 3 wherein the polymeric fluid loss control additive is a hydroxypropyl ether derivative of starch which has been slightly crosslinked with epichlorohydrin.

6. The fluid of claim 3 wherein the polymeric fluid loss control additive is selected from the group consisting of (1) a crosslinked ether derivative of a partially hydrolyzed starch, (2) a partially depolymerized, crosslinked ether derivative of starch, and (3) mixtures thereof.

7. The fluid of claim 6 wherein the water soluble polymer biopolymer is xanthan gum.

8. The fluid of claim 7 wherein the ether derivative is a hydroxypropyl ether.

9. The process of drilling a well wherein the fluid of claim 1 is circulated within a borehole being drilled as drilling proceeds.

10. The process of drilling a well wherein the fluid of claim 2 is circulated within a borehole being drilled as drilling proceeds.

11. The process of drilling a well wherein the fluid of claim 3 is circulated within a borehole being drilled as drilling proceeds.

12. The process of drilling a well wherein the fluid of claim 4 is circulated within a borehole being drilled as drilling proceeds.

13. The process of drilling a well wherein the fluid of claim 5 is circulated within a borehole being drilled as drilling proceeds.

14. The process of drilling a well wherein the fluid of claim 6 is circulated within a borehole being drilled as drilling proceeds.

15. The process of drilling a well wherein the fluid of claim 7 is circulated within a borehole being drilled as drilling proceeds.

16. The process of drilling a well wherein the fluid of claim 8 is circulated within a borehole being drilled as drilling proceeds.

17. The process of completing or working over a well wherein a subterranean formation is contacted with the fluid of claim 1.

18. The process of completing or working over a well wherein a subterranean formation is contacted with the fluid of claim 2.

19. The process of completing or working over a well wherein a subterranean formation is contacted with the fluid of claim 3.

20. The process of completing or working over a well wherein a subterranean formation is contacted with the fluid of claim 4.

21. The process of completing or working over a well wherein a subterranean formation is contacted with the fluid of claim 5.

22. The process of completing or working over a well wherein a subterranean formation is contacted with the fluid of claim 6.

23. The process of completing or working over a well wherein a subterranean formation is contacted with the fluid of claim 7.

24. The process of completing or working over a well wherein a subterranean formation is contacted with the fluid of claim 8.

25. A method of increasing the low shear rate viscosity of a well drilling and servicing fluid which comprises adding to the fluid from about 0.05 ppb to about 5 ppb of a low shear rate viscosity increasing additive selected from the group consisting of citric acid, alkali metal salts of citric acid, animonium citrate, and mixtures thereof, wherein the fluid comprises an aqueous liquid a biopolymer viscosifier, a particulate magnesia bridging agent wherein the magnesia has an Activity Index greater than about 800 seconds, and wherein the biopolymer is produced by fermentation of a carbohydrate source by the action of bacteria or fungi which is an excellular polysaccharide having a molecular weight in excess of about 500,000.

26. The fluid of claim 25 wherein the biopolymer is xanthan gum.

27. The method of claim 25 further comprising a polymeric fluid loss control additive selected from the group consisting of pregelatinized starch, starch derivatives, cellulose derivatives, and mixtures thereof.

28. The method of claim 27 wherein the polymeric fluid loss control additive is a starch derivative selected form the group consisting of hydroxyethyl starch, hydroxypropyl starch, hydroxyalkyl carboxymethyl starch, carboxymethyl starch, tertiary aininoalkyl ether derivatives of starch, and the slightly crosslinked derivatives of such derivatized starches, and mixtures thereof.

29. The method of claim 27 wherein the polymeric fluid loss control additive is a hydroxypropyl ether derivative of starch which has been slightly crosslinked with epichlorohydrin.

30. The method of claim 27 wherein the polymeric fluid loss control additive is selected from the group consisting of (1) a crosslinked ether derivative of a partially hydrolyzed starch, (2) a partially depolymerized, crosslinked ether derivative of starch, and (3) mixtures thereof.

31. The method of claim 30 wherein the biopolymer is xanthan gum.

32. The method of claim 31 wherein the ether derivative is a hydroxypropyl ether.

* * * * *